US012564147B2

(12) United States Patent
Wells

(10) Patent No.: US 12,564,147 B2
(45) Date of Patent: Mar. 3, 2026

(54) CLOSED LOOP SELF-WATERING SUB-IRRIGATION PLANTER

(71) Applicant: Kionna Harris Wells, Hazelwood, MO (US)

(72) Inventor: Kionna Harris Wells, Hazelwood, MO (US)

( * ) Notice: Subject to any disclaimer, the term of this patent is extended or adjusted under 35 U.S.C. 154(b) by 446 days.

(21) Appl. No.: 17/302,381

(22) Filed: Apr. 30, 2021

(65) Prior Publication Data

US 2021/0251162 A1 Aug. 19, 2021

Related U.S. Application Data

(63) Continuation-in-part of application No. 16/257,558, filed on Jan. 25, 2019, now abandoned.

(51) Int. Cl.
    *A01G 27/00* (2006.01)
    *A01G 9/02* (2018.01)
(52) U.S. Cl.
    CPC ........... *A01G 27/005* (2013.01); *A01G 9/021* (2013.01); *A01G 27/008* (2013.01)
(58) Field of Classification Search
    CPC ..... A01G 27/005; A01G 27/008; A01G 9/021
    See application file for complete search history.

(56) References Cited

U.S. PATENT DOCUMENTS

| | | | | |
|---|---|---|---|---|
| 32,942 | A * | 7/1861 | Griffin | A01G 27/02 47/79 |
| 4,160,342 | A * | 7/1979 | Dryer | A01G 27/04 47/80 |
| 4,991,346 | A * | 2/1991 | Costa, Jr. | A01G 27/04 47/79 |

(Continued)

FOREIGN PATENT DOCUMENTS

WO WO-2019088461 A1 * 5/2019 .......... A01G 27/005

OTHER PUBLICATIONS

Sawford Design; "Pentagonal Planter | Geometric Twisting Design | 3D Printed | Succulent Plant Pot | Dimensional Designs";https://www.etsy.com/listing/630971010/pentagonal-planter-geometric-twisting; first available date Aug. 23, 2018 (Year: 2018).*
Black Magic 3-d; "Conductive Graphene Filament (100 g), 1.75 mm"; https://www.amazon.com/product-reviews/B071RB3445/; first available Jun. 9, 2020 (Year: 2020).*
YouTube video from TimberWood Customs titled "3d Printed Self Watering Pot"; https://www.youtube.com/watch?v=Ty7cWlrpGQw (Year: 2018).*

*Primary Examiner* — Timothy D Collins
*Assistant Examiner* — Brittany A Lowery
(74) *Attorney, Agent, or Firm* — Stinson LLP

(57) ABSTRACT

A closed loop sub-irrigation self-watering planter of unitary construction amendable to additive or subtractive manufacturing. A three-dimensional outer mold line decorative flowerpot fused to a structural strength and moisture air lattice barrier, that is fused to a self-watering inner mold line sub irrigated planter. A divider divides an upper space of the planter for soil and a lower space for a water reservoir, wherein a conduit extends from the reservoir through the divider to an open end of the upper space, wherein the reservoir can be filled through the conduit. A soil opening in the divider communicates soil in the upper space with soil compacted in the second portion. A drain hole near an upper portion of the reservoir results in all water from the reservoir to pass through saturation holes in the second portion into the compacted soil therein for leaching into the soil of the upper spaced.

15 Claims, 5 Drawing Sheets

(56)         References Cited

U.S. PATENT DOCUMENTS

| | | | | |
|---|---|---|---|---|
| 5,644,868 | A * | 7/1997 | Lui ........................ | A01G 27/06 |
| | | | | 47/79 |
| 5,921,025 | A * | 7/1999 | Smith .................... | A01G 27/06 |
| | | | | 47/79 |
| 6,023,886 | A * | 2/2000 | Momiyama .......... | A01G 27/005 |
| | | | | 47/81 |
| 6,219,696 | B1 | 4/2001 | Wynblatt et al. | |
| 6,219,969 | B1 * | 4/2001 | Dion ..................... | A01G 27/02 |
| | | | | 47/79 |
| 7,171,783 | B1 * | 2/2007 | Fidotti .................. | A01G 27/04 |
| | | | | 47/81 |
| 2005/0252080 | A1 * | 11/2005 | Wright .................. | A01G 27/04 |
| | | | | 47/79 |
| 2009/0292042 | A1 * | 11/2009 | Patterson ................ | A01G 9/02 |
| | | | | 523/128 |
| 2011/0131879 | A1 * | 6/2011 | Altendorfer ........... | A01G 27/04 |
| | | | | 47/81 |
| 2016/0066522 | A1 * | 3/2016 | Walker, II ............. | A01G 27/02 |
| | | | | 47/81 |
| 2016/0081283 | A1 * | 3/2016 | Pierce .................. | A01G 27/003 |
| | | | | 47/80 |
| 2016/0150746 | A1 * | 6/2016 | Wood ........................ | B09B 3/00 |
| | | | | 47/79 |
| 2016/0183485 | A1 * | 6/2016 | Petry ..................... | A01G 27/06 |
| | | | | 47/79 |
| 2018/0229863 | A1 * | 8/2018 | Veto ....................... | B64G 1/402 |

* cited by examiner

TYPE: VON MISES STRESS
UNIT:KSI 0.1205 MAX
0.0964
0.0723
0.0482
0.0241
0 MIN

MAX: 0.1205 KSI

TYPE: DISPLACEMENT
UNIT:IN 0.001001 MAX
0.000801
0.000601
0.000401
0.0002
0 MIN

MAX: 0.001001 IN

MIN: 0 IN

TYPE: X DISPLACEMENT
UNIT:IN 1.291e-04 MAX
1.033e-04
7.748e-05
5.165e-05
2.583e-05
0e+00 MIN

MIN: 1.274e-04 IN

MAX: 1.291e-04 IN

SOIL
38 LBS DRY
55LBS WET

POT
24 LBS

WATER
5.8 LBS
0.7 GALLONS

CLOSED LOOP SELF-WATERING SUB-IRRIGATION PLANTER

CROSS-REFERENCE TO RELATED APPLICATION

This application claims the benefit of priority of U.S. non-provisional application Ser. No. 16/257,558, filed 25 Jan. 2019 as a Continuation in Part, the contents of which are herein incorporated by reference.

BACKGROUND OF THE INVENTION

The present invention relates to self-watering planters, sub-irrigation containers and, more particularly, to a single-component self-watering planter embodying a closed loop reservoir system, whereby the self-watering planter is amenable to an additive or subtractive manufacture method of manufacturing.

Most people who want to grow plants as a hobby have a hard time maintaining an adequate and sustainable watering schedule for their growing pots or containers. The problem with conventional flower pots or planters is that they require daily and/or weekly watering maintenance schedules, while most consumers' busy schedules do not allow for such necessary time and commitment to care for living plants.

Current "self-watering" containers use a third component in the form of a tubed wicker or fabric wicker, and/or use multiple moving mechanical parts, all of which demand high maintenance. Furthermore, conventional self-watering systems also require electricity or another external means for supplying an adequate water source, which also needs to be maintained, as well as adds to the overall cost of these solutions. Finally, because of the inherent requirement for additional components and/or external means, and the attendant costs, today's self-watering containers offer minimum choices in terms of personalization or size selection.

Some prior art devices may be previously designed to capture the self-watering featured and purpose of plant watering via capillary action. Although these arts my exist they are still complicated multiple piece systems. These systems require attachments and apparatus that are unreasonable during operation and assembly and very costly to manufacture and produce.

Furthermore, some prior art, such as U.S. Pat. No. 6,219, 696 calls for the device's inner container devices to be transferred, transported or moved during the build and operation.

Prior art also calls for a novel bucket and insert for separation of a standard five-gallon or six-gallon bucket.

As can be seen, there is a need for a self-watering planter embodying a closed loop, structurally strong, sub-irrigation reservoir system that has zero moving parts, no physical wicker component so that consumers can conveniently grow and maintain their flowers, fruit, vegetables, and other organics with minimal time and monetary commitments. Furthermore, the closed loop sub-irrigation reservoir system of the present invention enables a single-component self-watering planter-capable of being made via 3D printing, laser sintering technology, injection molding, additive and subtractive manufacturing or the like process. Thereby allowing for the creation of customizable, strong, decorative variable-sized planters and containers for the home, office, urban patio and garden. The present invention does not require watering for up to 30 days, while still facilitating flowers, fruit, vegetables, and other organics to grow during that time period through use of gravity to filter water through the soil via its natural root absorption system while maximizing the use of the already existing and readily available soil to supply the growing plant with nutrients. The present invention uses an inner structural strength unit to maximize the mechanical strength properties of the closed loop sub-irrigation gravity absorption system.

The present invention does not require transferring or moving any parts of the pot and unit. This device has no moving parts and is fused to the outer strength and inner self watering three-part fused system. The present invention also has no size limitation to the container size.

SUMMARY OF THE INVENTION

In one aspect of the present invention, a closed loop sub-irrigation self-watering planter of unitary construction includes the following: The present invention embodies a three-part fused, self-watering system is a system. The present invention is constructed using a three-dimensional (1) outer mold 12 for (in certain embodiments, decorative) flower pot fused to (2) a structural strength unit 18 having a moisture air lattice barrier that is fused to a (3) self-watering inner mold line sub irrigated planter 10. Creating the effect of a pot within a pot within a pot system.

In another aspect of the present invention, the a closed loop sub-irrigation self-watering planter of unitary construction further includes a soil core defined by the soil opening and the second portion, and wherein a reservoir defined by the outer shell, the first portion and the second portion; and a plurality of spaced apart saturation holes spaced apart along the divider, wherein the saturation holes, based on a 4 inch tall basic square design, are spaced equally across a 3.5 inch×3.5 inch divider. The holes are approximately ⅛-inch in diameter, ½ inch from center to center, and are equally spaced across the divider. The soil core may be placed in the center of the divider and may be ½ inch in diameter. The soil core may be 1½ inch tall and may be the same depth of the reservoir. There may be four or more support structures (approximately 1 inch in diameter) and extending between the divider and the lower portion of the outer shell to support the former. The reservoir may be 1½ inch tall by 3½ inch by 3½ inch wide, based on a 4-inch tall basic square design. The size of the container is scalable and is limited in size only by the method of manufacturing.

In another aspect of the present invention, a method of growing a plant in a self-watering planter so that the plant need not be watered more than once every 30 days including the following components: designing the above-mentioned self-watering planter so that the reservoir is dimensioned to provide sufficient volume for holding water; filling the upper space with soil; compactly, relative to the upper space, filling the soil core with soil; planting the plant in the soil of the upper space; and pouring water in an upper portion of the planter.

In one aspect of the present invention, a self-watering planter of unitary construction, includes: an inner shell defining a cavity; an outer shell; a moisture air barrier sandwiched between and fused to both the inner shell and the outer shell; a divider having: a tubular section extending between a lower end and an upper open end; a planar section extending radially from the upper open end, separating the cavity into a first interior environment from a second interior environment and a third interior environment, wherein the tubular section separates the second interior environment from the third interior environment; and a plurality of aeration holes spaced apart along the divider; a drain hole one inch or less downward from the planar section; and a conduit fluidly connecting the second interior environment and an exterior environment.

In another aspect of the present invention, the self-watering planter of unitary construction wherein the moisture air barrier is a lattice material, wherein the lattice material is a corn-based plastic material, wherein the drain hole fluidly connects the second interior environment with the exterior environment, wherein at least one face of the outer shell comprises a twist of one to 180 degrees so that a lower portion of the outer shell protrudes between one-eighth of an inch to three inches from the moisture air barrier, wherein the conduit is a fixed and porous water-spout, wherein one or more of the plurality of aeration holes are teardrop shaped.

In yet another aspect of the present invention, a method of growing a plant in the above-mentioned self-watering planter of unitary construction so that the plant need not be watered more than once every 30 days, comprising: filling the first and third interior environments with soil; compactly, relative to the first interior environment, the soil of the third interior environment; planting the plant in the soil; and pouring a fluid in an upper portion of the waterspout until the fluid flows through the drain hole.

The soil media is very important with container growing. The soil media should be well aerated and drained, while retaining enough moisture for organic growth. Container soil can also be soilless, house artificial media, or have no soil at all. As commonly known, there are various soil types and medias; these include peat, vermiculite, bark, coir fiber, ground coconut hulls, and/or, a variety of mixtures. The choice of media will be directed by what type of organic that is growing. The closed loop self-watering planter can accommodate any and all soil types.

The soil media can be modified or amended based on achieving an acceptable soil mixture, that can be made one-part garden soil, one-part peat moss, and one-part perlite or coarse builders' sand. The soil media for topicals and foliage plants, may require more peat and less course material as these plants tend to prefer more moisture and wetter growing conditions.

A sheet of thin barrier material may be made from unbleached 100 g/m2 filter paper and may be placed between the soil media and the rest of the container. The material keeps the soil media from infiltrating the reservoir, while allowing water to drain and pass through until decomposition occurs. The components allow for aeration and space for roots to grow while allowing for gravity and the natural movement of the root system to create a complete homeostasis within the closed loop planter.

In another aspect of the present invention, a method of manufacturing a self-watering planter of unitary construction so that sizes and shapes are customizable, includes the following creating a solid model of the above-mentioned self-watering planter of; and growing layer by layer through additive or subtractive manufacturing the divider, the conduit, the drain hole of said self-watering planter as the outer shell thereof is built up.

Graphene material, which is a material that has water filtration properties and will enhance the usability of the planter. The use of graphene as a water filtration barrier increases organic material growth and water sanitization. Graphene is a two dimensional tightly packed layer of carbon atom that are bond in a hexagonal honeycomb lattice, similar to the structural barrier design within the planter; accordingly, creating a membrane that will allow water to filter through the graphene, and that removes impurities as the water circulates and recirculates through the planter while growing live matter. The planar drain layer is solid, creating a structurally sound unit capable of carrying ten times the load of a traditional planter combination. The drain layer may include graphene material layer in the drain layer portion shown at detail 23 of the drawing.

The solid lower section of the outer mold 12, below the water reservoir is solid and permits for a section within the bottom to house a rotating magnet while remaining separate from the water, soil, and plant. The magnetized planter will be placed onto an opposing polar magnet plate in order to rotate the plant and planter. The rotation of the plant is ideal for indoor growth. The plant will receive ideal lighting from a singular source while providing a stationary location for the plant to grow in. The planter may also be made from an even stronger bio plastic using hemp infused polylactic acid/polylactide (PLA) or polyethylene terephthalate glycol (PETG). The specialty hemp infused PLA or PETG will improve the strength and mechanical properties of the structure.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a self-watering planter of unitary construction amendable to additive manufacture, and so making such planters conveniently customizable in terms of size and shape. A divider divides an upper space of the planter for soil and a lower space for a water reservoir, wherein a conduit extends from the reservoir through the divider to an open end of the upper space, wherein the reservoir can be filled through the conduit. The divider provides a planar first portion and a tubular second portion that depend therefrom into the reservoir. A soil opening in the first portion communicates soil in the upper space with soil compacted in the second portion. A drain hole near an upper portion of the reservoir causes all water from the reservoir to pass through saturation holes in the second portion into the compacted soil therein for leaching into the soil of the upper spaced. Thereby, this closed loop reservoir sub-irrigation system enables one watering of the reservoir to provide sufficient water of the soil of the upper space for 30 days.

Figure 4:
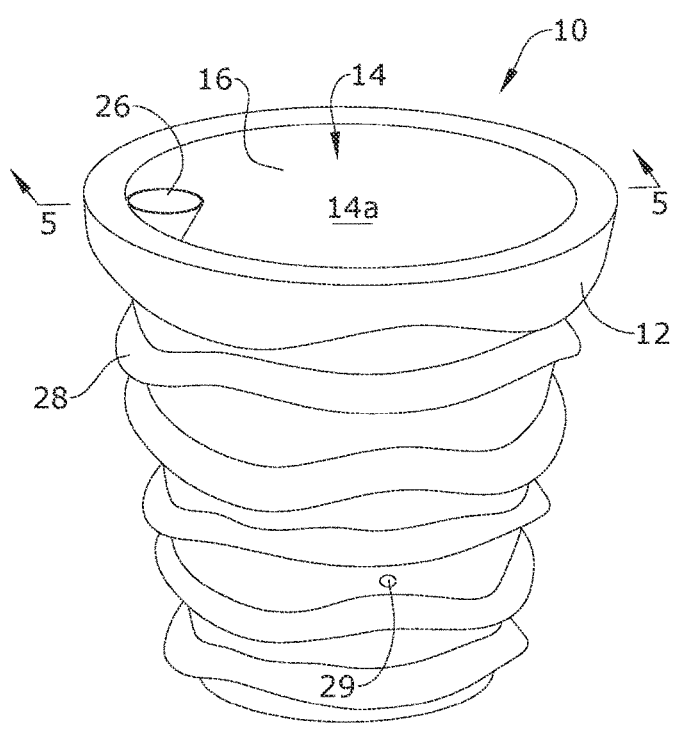
FIG. 4 is a perspective view of an exemplary embodiment of the present invention.
Figure 5:
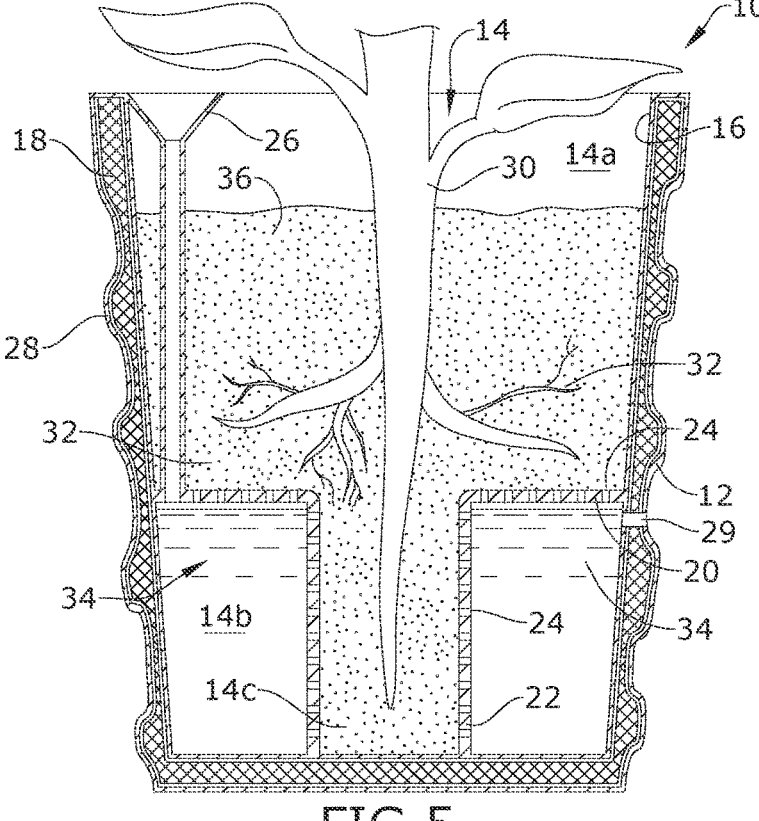
FIG. 5 is a section view of an exemplary embodiment of the present invention, taken along line 5-5 in FIG. 4.
Figures 6, 7, 8:
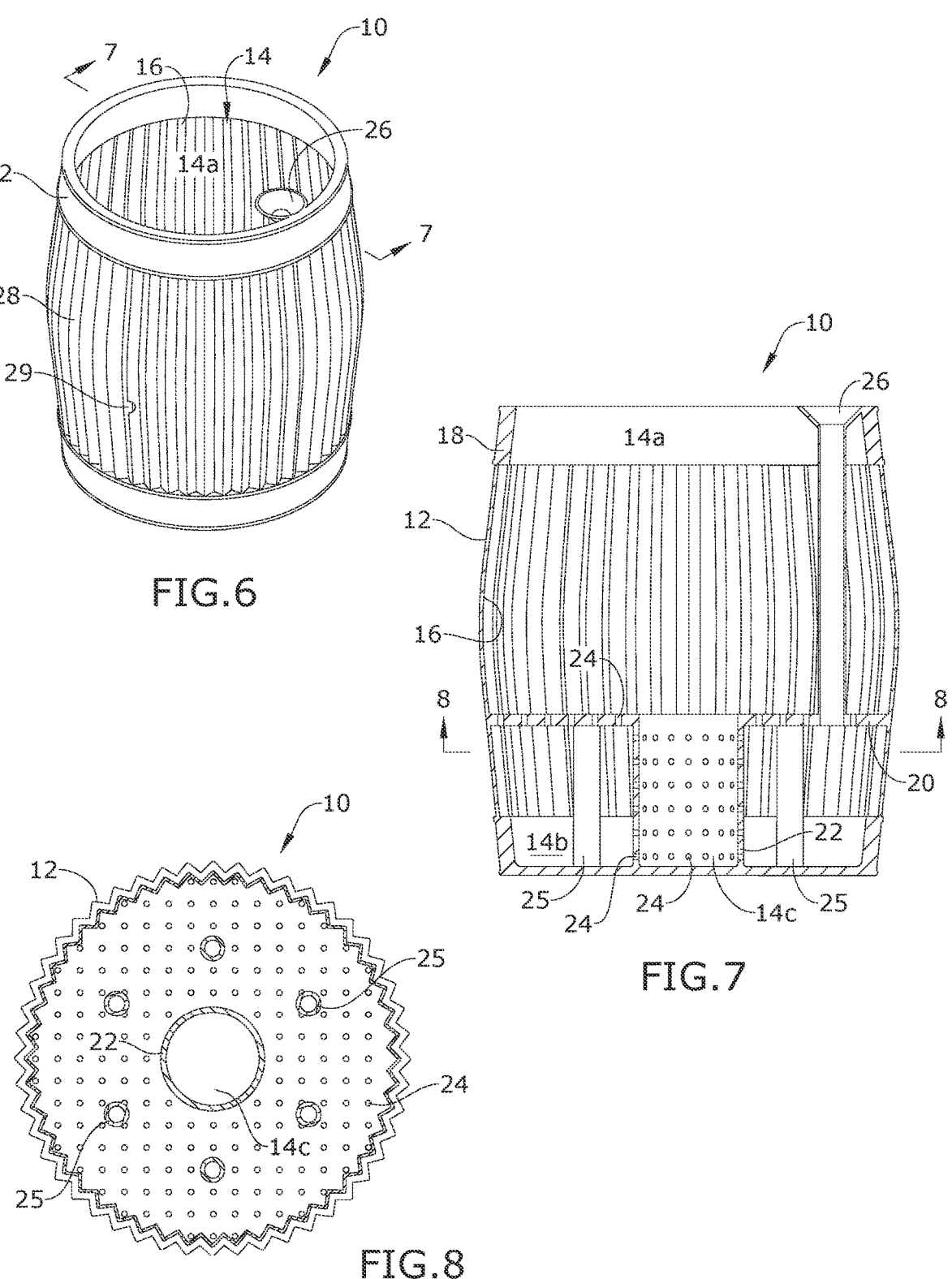
FIG. 6 is a perspective view of an exemplary embodiment of the present invention.
FIG. 7 is a section view of an exemplary embodiment of the present invention, taken along line 7-7 in FIG. 6.
FIG. 8 is a section view of an exemplary embodiment of the present invention, taken along line 8-8 in FIG. 7.
Figure 9:
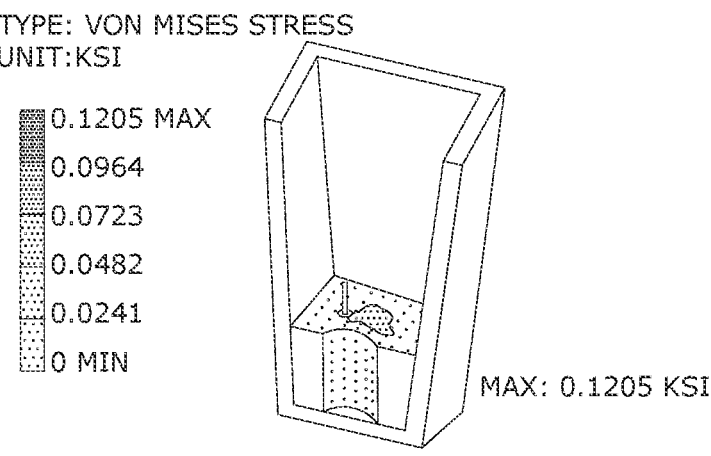
FIG. 9 is a schematic view of an exemplary embodiment of the present invention.
Figure 10:
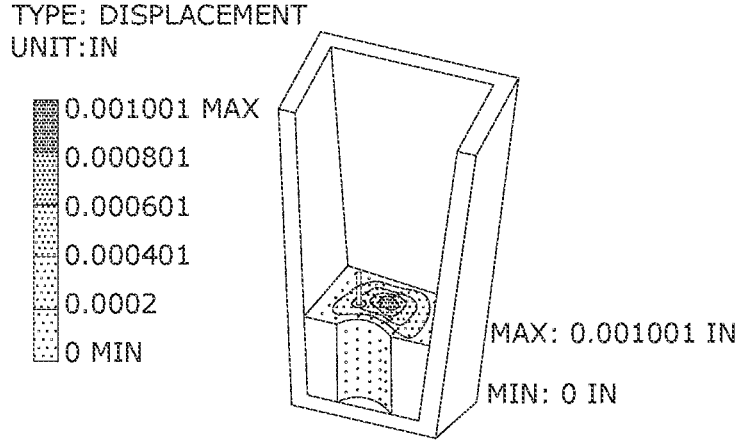
FIG. 10 is a schematic view of an exemplary embodiment of the present invention.
Figure 11:
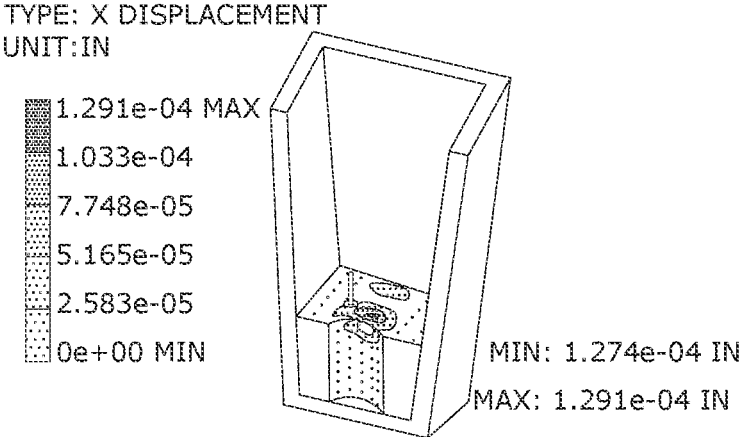
FIG. 11 is a schematic view of an exemplary embodiment of the present invention.
Figure 12:
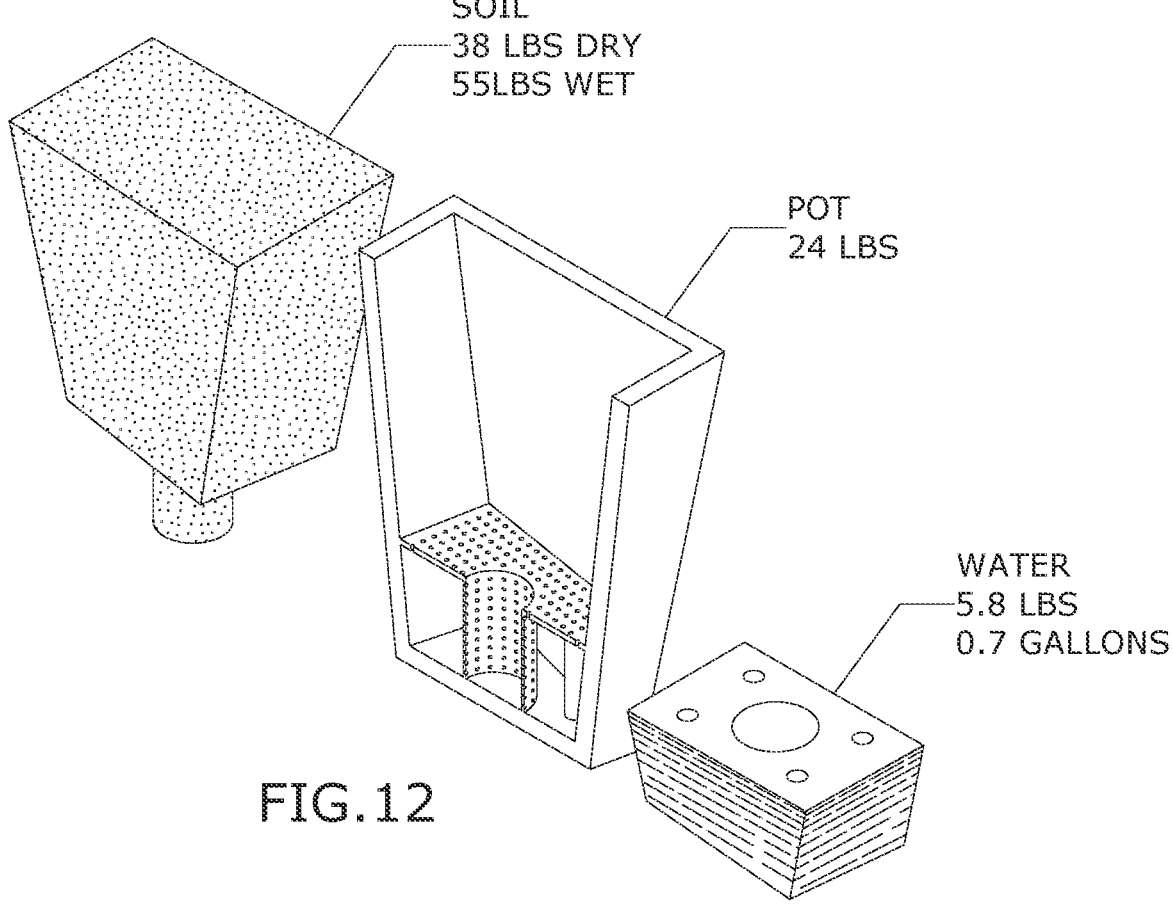
FIG. 12 is a schematic view of an exemplary embodiment of the present invention.

Referring to FIGS. 1 through 12, the present invention may include a closed-loop, self-watering, sub-irrigation planter 10. The planter 10 has an inner mold/shell 16 that defines a cavity or an interior environment 14. An outer mold/shell 12 may be fused to a structural component 18 that is sandwiched by and fused to an inner mold/shell 16. The outer mold/shell 12 may have decorative features, as illustrated in FIG. 4.

The interior environment 14 may include a first compartment/interior environment 14a, a second interior environment 14b, and a third interior environment 14c. A divider 20 may separate the first interior environment 14a and the third interior environment 14c from the second interior environment 14b. The divider 20 includes a tubular section 22 and a planar section 23, generally orthogonally relative to the tubular section 22, wherein the planar section 23 extends radially from a periphery of the upper portion of the tubular section 22. The lower portion of the tubular section 22 rests on a base portion 17 of the outer mold/shell 12. The base portion 17 may be made of magnetizable material. The divider 20 has a plurality of spaced apart aeration holes 24 across both the tubular section 22 and the planar section 23. The interior of the tubular section 22 defines the third interior environment 14c. The inner mold/shell 16 and planar section (being the floor) define the first interior environment 14a. The inner mold/shell 16, the exterior of the tubular section 22, the base portion 17, and the planar section 23 (as the ceiling) defines the second interior environment 14b.

There may be posts 25 extending between the base portion 17 and the underside of the planar section 23. A watering spout 26 may fluidly couple the second interior environment 14b and the exterior environment; accordingly, the watering spout 26 may extend through the entirety of first interior environment 14a. The watering spout 26 may be porous, fixed, and fused to the planter 10.

A drain hole 29 may fluidly communicate the second interior environment 14b to the exterior environment through the outer mold/shell 12, wherein the entire drain hole 29 is at an elevation below the divider 20. The drain hole 29 may be disposed just downward of the planar section 23.

In use, soil may be placed in the first and the third compartments 14a and 14c for supporting a plant 30 and its roots 32 therein. A user may fill the second interior environment 14b with fluid 34 through the watering spout 26 until the fluid 34 drains from the drain hole 29.

The present invention embodies a three-part fused, self-watering system is a system. The present invention is constructed using a three-dimensional (1) outer mold/shell 12 for (in certain embodiments, decorative) flower pot fused to (2) a structural strength unit 18 having a moisture air lattice barrier that is fused to a (3) self-watering inner mold line sub irrigated planter 10. Creating the effect of a pot within a pot within a pot system.

The result is a one-piece, unitary construction of a closed loop system, which provides a homeostasis for any growing organic. The system acts on gravity and its own mechanical kinematic system that simulates an underground sub-irrigation system that is found in nature. The closed gravity three-part system creates an environment that keeps pests out while using gravity, aeration throughout the structural barrier, and the natural growing material throughout the planter 10 to enhance growth and maximize the time to grow.

Figures 1, 2, 3:
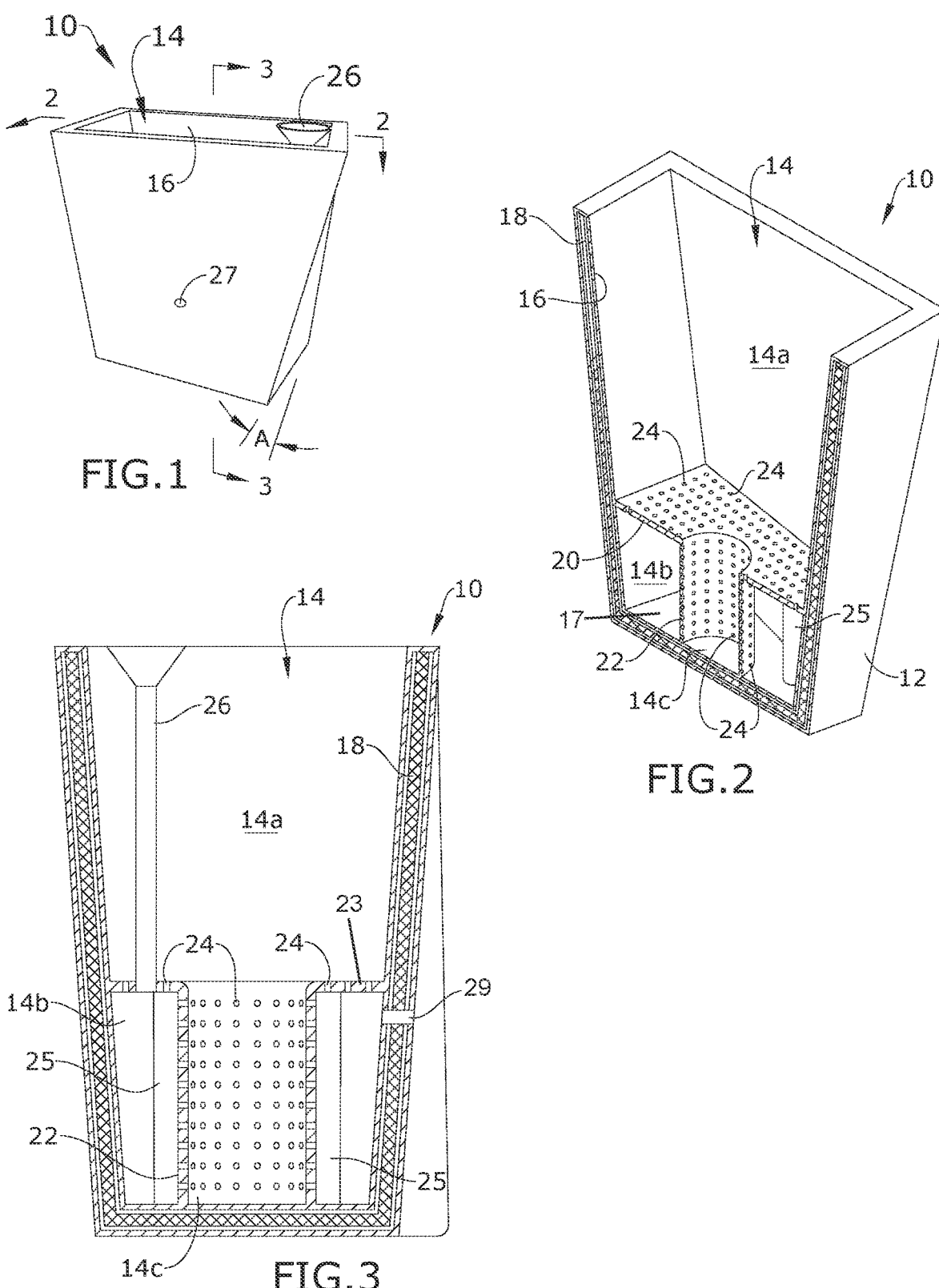
FIG. 1 is a perspective view of an exemplary embodiment of the present invention.
FIG. 2 is a perspective section view of an exemplary embodiment of the present invention, taken along line 2-2 in FIG. 1.
FIG. 3 is a section view of an exemplary embodiment of the present invention, taken along line 3-3 in FIG. 1.

The present invention provides an aesthetically pleasing, decorative, minimalistic outer exoskeleton planter combination. The outer mold is a three-dimensional artistic structure that extends and protrudes from the surface of the planter. The outer mold has the ability to twist, as denoted in FIG. 1 as 'A'. The twist A can range from one to 180 degrees, thereby defining a protrusion (see the lower right hand horizontal corner line in FIG. 3) with varying possibly lengths, starting at ⅛ inch and protruding up to three inches from the surface. The outer decorative surface can take the shape and form of a physical object, such as a heads, pet bodies, or any other inanimate three-dimensional object that can be perceived. The twist A may refer to a face of the outer shell 12 that is twisting or spiraling about a centrally disposed longitudinal axis, as illustrated in FIG. 1.

The planter may also be made from an even lighter weight corn-based plastic called Polylactic acid, or polylactide (PLA). PLA and the planters are recyclable by both chemical or mechanical means. The use of PLA along with structural unit per makes the self-watering planter described ten to fifty percent lighter than any other decorative pot and self-watering apparatus combination. The PLA material is lighter than any traditional flowerpot constructor, these include being lighter than clay, glass, metal, and other traditional plastic flowerpots.

The barrier and strength layer may be between the outer decorative layer and the inner self watering apparatus. The inner structural strength unit 18 may be a lattice of PLA material and is in the shape a bird's bone marrow structure. Birds have pneumatic (air-filled) bones; the air spaces may make up the majority of the bone's volume. The inner structural strength unit 18 may have air spaces that make up the majority of the build. The structure is porous and light weight yet strong. The structure encases the entire planter and unit from top to bottom, and forward and aft of the planter. The thickness of each wall separation is thin at 1 mm-10 mm and is based on the overall gallon size.

The present invention does not require a valve. This new art claims to use natural kinetic energy to pressurize and move the air and water through the planter. Creating a mini greenhouse effect throughout the pot's ecosystem, creating homeostasis within the planter.

The planter 10 can range in liquid sizes from less than 1 gallon up to and exceeding 2000 gallons. Sizes can be achieved while maintaining a one-piece decorative three-dimensional lightweight art per the prior art.

The present invention completely solves the problem of never mixing the solid soil or medium with the reservoir water because there is no insert or detachments of any chambers or walls.

The present invention does not require a plurality of wicks. The design uses the kinetic energy and closed loop technology in order to provide an environment, where additional wicks or fibrous material are needed to move and absorb the water. The planter has a built-in aeration system that facilitates the root's natural capillary system to move through the growth process. The present invention does not require any inorganic to be introduced to the grow and planter. There are no fasteners, zips, ties, metal clips, glue nor cords inside of the planter.

The present invention has 1 mm-10 mm walls that are 100% solid. The drain holes 29 extends and passes through all three-layer combinations and structures, as a solid one piece liner drain hole 29.

The divider 20 has aeration holes 24 throughout the middle planar and tubular portions of the divider. The aeration holes 24 can be constructed with round holes or tear dropped shaped holes.

There is no assembly required and the final product does not call for any inserts. No assembly is required. The self-watering apparatus and complete three-dimensional art and functional pot does not have an extension and hood.

The present invention has a three part system that is fused together using PLA material. The structure and aeration does not call for charcoal, peat, moss, nor any other absorbent material as a means to deter unpleasant soil odor. The system does not require additional medium because the planter has proper drainage, aeration, and a homeostasis system found in nature, similar to the structure of a "cenote" and greenhouse.

The present invention does not call for a projecting spacer rings and tubular extension. The system does not call for any external metal nor mechanical attachments and components.

The present invention may embody a closed loop reservoir system that has zero moving parts, wherein the self-watering planter may be a unitary construction capable of being made with additive manufacturer.

The self-watering planter provides an outer shell dimensioned to define a cavity to accommodate sufficient soil and water for a variety of different plant life. The outer shell extends from a closed lower end to an open upper end. It should be understood by those skilled in the art that the use of directional terms such as lower, bottom, upper, top, and the like are used in relation to the illustrative embodiments as they are depicted in the figures. For example, the upward (upper) direction being toward the top of the corresponding figures and a downward (lower) direction being toward the bottom of the corresponding figure.

A divider divides the cavity between a lower space and an upper space. The divider provides a planar first portion and one or more tubular second portions depending therefrom. One of the second portions may be centrally disposed along the first portion as said second portion extends into the lower space. It is to be understood that although the Figures show only one second portion for the sake of clarity, there are embodiments that include more than one second portions, some communicating with a soil opening communicating with the upper space and others possibly that are closed off on an upper end by the first portion, whereby these latter second portions are more for structural support.

The first and second portions and have spaced apart saturation holes there along, whereby the saturation holes fluidly communicating the lower and upper spaces. The saturation holes may be ⅛-inch diameter holes equally spaced across a 3.5-inch×3.5-inch surface, ½ inch from center to center, covering the entire surface area of the divider, including first portion and the second portion(s). The ⅛-inch holes continue with the same matrix into and including the soil core.

The divider 14 may be horizontally oriented relative to any supporting surface the lower end would be supported on. The first portion may be adapted to support soil contained within the upper space. Soil could also fill (through the above-mentioned soil opening) and occupy the space defined by one or more of the second portions, such second portion space is also known as a soil core. The remaining space of the lower space not occupied by a second portion and/or soil core, may be filled by a fluid, such as water and will be referenced as the reservoir hereafter. Note the spaced apart saturation holes along each tubular second portion fluidly connects the reservoir with the relevant soil core.

A conduit may extend from the reservoir through the first portion to near, at, or adjacent to the open upper end by less than ¼ inch. The circumference of the conduit may be proportionate to the outer shell size. The conduit may start ½ inch from the bottom of reservoir. The conduit may be always covered with a standard ½-inch diameter marble. The marble aids in providing a closed loop system, and prevents unwanted dirt and other organics to enter the reservoir.

A drain hole may fluidly connect the reservoir to an exterior of the outer shell for draining the water, keeping the reservoir from overflowing. The drain hole may be ¼-½ inch in diameter. The drain hole also creates an air gap in between the divider and the reservoir, and so water in the reservoir may only migrate to the soil of the upper space through the soil in the soil core.

The divider is adapted to be a drain layer between the upper space (containing soil) and the lower space (containing water), whereby any excess water from the soil may flow back to the reservoir. Each tubular second portion may be adapted to be a column that holds of the first portion and any soil thereon that it supports. Each tubular second portion may be manufactured using a corrugated tubing method. Note, in the embodiment with a plurality of tubular second portions, only one may communicate to the upper space through the soil opening in the first portion for allowing soil to continuously fill the soil core space of that second portion and the soil of the upper space. Soil in the soil core space tends to be compacted to a greater extent or to a more particularity 35% less dense relative to the soil in the upper space.

Support posts may assist in supporting the structural weight of the soil media and plant. The supports may be 1-inch diameter and extend the depth of the reservoir supporting the divider on a lower portion of the outer shell.

3D software may be utilized to create a solid model with the use of rapid prototyping. The components and parts can be built using 3D printing or additive manufacturing technology. The present invention and all items will be fabricated all as one single piece, layer by layer: the divider, the conduit, the drain hole may be built up as the outer shell is additively manufactured. For the purpose of manufacturability, the saturation holes may be tear drop shaped instead of complete circles.

A method of using the present invention may include the following. The self-watering planter disclosed above may be provided. A user would fill the upper space with soil and relatively more compacted soil in the soil core. Then the user may provide water through the upper end of the conduit filling up the reservoir, whereby excess water will flow through the drain hole in the reservoir. With the reservoir dimensioned to provide water to the soil of the upper space through the saturation holes of the soil core only, the user need only water the reservoir one time every days or more. Specifically, soil that occupies the soil core is fluidly coupled to the reservoir through the vertical oriented saturation holes. The soil of the soil core is the point of moisture contact for the remaining soil of the upper space-allowing for water to filter throughout the system and keep the roots of the plant life properly watered of a 30-day timeline with just one filling of the reservoir.

Most consumer have a hard time maintaining an adequate and sustainable watering schedule for their growing pots, planters, or containers. The extended water scheduling time enabled by the present invention will allow the user more leisure time by lessening the watering cycle schedule, as well as take the worry out of forgetting to water their flowers, fruit, vegetables, and other organics.

Additionally, the present invention can be used in any field that requires draining or proper draining while growing or maintain adequate water supply. The present invention can be used in a large scale outside growing area where gardening may be difficult due to an adequate water supply. The large scale closed loop sub-irrigation planter will be used in large scale sustainable agriculture units and vertical farm units.

It should be understood, of course, that the foregoing relates to exemplary embodiments of the invention and that modifications may be made without departing from the spirit and scope of the invention as set forth in the following claims.

What is claimed is:

1. A self-watering planter comprising:
a planter body that has a bottom end and a top end, the planter body including a base wall at the bottom end and at least one side wall extending from the base wall to the top end of the planter body, the base wall and the at least one side wall defining an interior environment, wherein the base wall and the at least one side wall comprises an inner shell, an outer shell, and a structural layer between the inner shell and the outer shell, wherein the structural layer is a lattice with air spaces defined between the inner shell and the outer shell; and
a divider integrally connected to the planter body so that the self-watering planter has a one-piece, unitary construction, the divider disposed within the interior environment, the divider including a tubular section that has a cylindrical shape, the tubular section including a lower end connected to the base wall and an upper end that is open, the divider including a planar section radially extending from the upper end of the tubular section to the at least one side wall,
wherein the divider defines a first soil space within the interior environment located above the planar section, a second soil space within the tubular section, and a fluid reservoir below the planar section and outside of the tubular section,
wherein the lower end of the tubular section is seamlessly connected to the inner shell at the base wall and the planar section is seamlessly connected to the inner shell at the at least one side wall, and
wherein the divider includes a plurality of aeration holes along both the planar section and the tubular section to permit water transfer through both the planar section and the tubular section, between the first soil space, the second soil space, and the fluid reservoir, while restricting soil transfer.

2. The self-watering planter of claim 1, wherein the structural layer is fused to the inner shell and is fused to the outer shell.

3. The self-watering planter of claim 1, wherein the planter body, including the inner shell, the structural layer, and the outer shell, is composed of a plastic material.

4. The self-watering planter of claim 3, wherein the plastic material is polylactic acid (PLA).

5. The self-watering planter of claim 1, wherein the lattice of the structural layer is composed of a polylactic acid (PLA) material.

6. The self-watering planter of claim 1, wherein the air spaces define a majority of the volume of the structural layer.

7. The self-watering planter of claim 1, wherein the planter body defines a drain hole that continuously extends through the inner shell, the structural layer, and the outer shell, the drain hole disposed below the planar section of the divider.

8. The self-watering planter of claim 7, wherein the drain hole creates an air gap between the planar section of the divider and a top surface of a fluid in the fluid reservoir.

9. The self-watering planter of claim 1, wherein the top end of the planter body is open.

10. The self-watering planter of claim 1, further comprising a spout extending through the planar section of the divider and configured to provide a conduit for filling the fluid reservoir.

11. The self-watering planter of claim 1, wherein the aeration holes are evenly spaced throughout a surface area of both the planar section and the tubular section of the divider.

12. A self-watering planter comprising:
a planter body that has a bottom end and a top end, the planter body including a base wall at the bottom end and at least one side wall extending from the base wall to the top end of the planter body, the base wall and the at least one side wall defining an interior environment, wherein the base wall and the at least one side wall comprises an inner shell, and outer shell, and a structural layer between the inner shell and the outer shell, wherein the structural layer is a lattice with air spaces defined between the inner shell and the outer shell; and
a divider integrally connected to the planter body so that the self-watering planter has a one-piece, unitary construction, the divider disposed within the interior environment, the divider including a tubular section that has a cylindrical shape, the tubular section including a lower end connected to the base wall and an upper end that is open, the divider including a planar section radially extending from the upper end of the tubular section to the at least one side wall,
wherein the divider is composed of graphene,
wherein the divider defines a first soil space within the interior environment located above the planar section, a second soil space within the tubular section, and a fluid reservoir below the planar section and outside of the tubular section,
wherein the lower end of the tubular section is seamlessly connected to the inner shell at the base wall and the planar section is seamlessly connected to the inner shell at the at least one side wall, and
wherein the divider includes a plurality of aeration holes along both the planar section and the tubular section to permit water transfer through both the planar section and the tubular section while restricting soil transfer.

13. The self-watering planter of claim 12, wherein the planter body, including the inner shell, the structural layer, and the outer shell, is composed of polylactic acid (PLA).

14. The self-watering planter of claim 12, wherein the aeration holes are evenly spaced throughout a surface area of both the planar section and the tubular section of the divider.

15. The self-watering planter of claim 1, wherein the planter body is composed of polylactic acid (PLA) and the divider is composed of graphene.

* * * * *